United States Patent [19]
Fichtali et al.

[11] Patent Number: 5,855,688
[45] Date of Patent: Jan. 5, 1999

[54] BANANA STARCH

[75] Inventors: Jaouad Fichtali; Yaw J. Owusu-Ansah; Peter Chang, all of Saskatoon, Canada

[73] Assignee: Banana Products Corporation, Birmingham, Ala.

[21] Appl. No.: 824,304

[22] Filed: Mar. 26, 1997

[30] Foreign Application Priority Data

Mar. 27, 1996 [CR] Costa Rica ................................. 5293

[51] Int. Cl.⁶ .................................................. C08B 30/04
[52] U.S. Cl. .......................................................... 127/68
[58] Field of Search ................................................. 127/68

[56] References Cited

FOREIGN PATENT DOCUMENTS

Sho
49-149139  7/1976  Japan ............................... C13L 1/00

OTHER PUBLICATIONS

"Magnesium Bisulfite and Sodium Bisulfite as Alternative Steeping Agents for Wet Milling", Rausch, Singh, and Eckhoff, Cereal Chemistry, vol. 70(4)(1993) pp. 489–490 no month available.

"Studies on Banana Pseudostem Starch: Production, Yield, Psysico–Chemical Properties and Uses", Subrahmanyan, Lai Bhatia, Jain, Bains, Srinath, Anandaswamy, Krishna and Lakshminarayana; J. Sci. Food Agric., (May 8, 1957,) pp. 253–261.

"Physicochemical Studies on Starches Isolated from Plantain Cultivars, Plantain Hybrids and Cooking Bananas", Eggleston, Swennen and Akoni, Starch/Stärke, vol. 44(4), (1992,) pp. 121–127 no month available.

"Characterization of the Starch and Fiber Fractions of Banana Fruit", Kayisu, a Thesis Presented to the Graduate School of Cornell University, (Jan., 1980) pp. 1–128.

"A Pilot Scale Study for Banana Starch Production", Chiang, Chu and Chu, Starch/Stärke, vol. 39(1),(1987), pp. 5–8 no month available.

"Physicochemical Properties of Banana Fruit Starch and Starch Components", Patil and Magar, J. Indian Chem. sco., vol. LI, (Dec., 1974) pp. 1004–1007.

"Physical Properties of Starch from Cavendish Banana Fruit", Ling, Osman, Fernandes and Reilly, Starch/Stärke, vol. 34(6), (1982) pp. 184–188 no month available.

"Characterization of Starch and Fiber of Banana Fruit", Kayisu, Hood and Vansoest, Journal of Food Science, vol. 46,(1981) no month available pp. 1885–1890.

"Investigation of the Physical and Chemical Properties of Banana Starches", Lii, Chang and Young, Journal of Food Science, vol. 47,(1982) no month available pp. 1493–1497.

*Primary Examiner*—David Brunsman
*Attorney, Agent, or Firm*—Barnes & Thornburg

[57] ABSTRACT

A high quality starch, wholesome to be used for food applications is produced from green unpeeled bananas though a cost efficient, commercially viable process. The process steps involve an optional initial comminution, lye milling of the bananas, holding the milled solution for a minimum of 1 hour, sieving to remove pomace and fiber, concentrating, neutralizing the starch solution, dewatering and drying. The final product is of very high quality and devoid of detectable pesticide and/or fungicide residues.

15 Claims, No Drawings

BANANA STARCH

FIELD OF INVENTION

The present invention relates to a process for the production of food grade starch from unpeeled, unripe, green bananas in which process the bananas are comminuted and milled in lye solution, screened to remove pomace and peel fibers from the starch milk. The starch milk is centrifuged for concentration, washing and dewatering and the dewatered starch dried to produce the final starch product. The invention also relates to a starch product of food grade quality produced by the process.

DESCRIPTION OF THE PRIOR ART

Bananas (Musa sp) are grown in tropical and subtropical regions of the world. The crop is of major importance to the people in those regions as they form a major portion of the annual income and also a source of food. Bananas culled from processing plants due to undersizing, blemishes, rejects trimmings or cuts are given away or used in landfills. The major component of green and processed bananas is starch. The starch forms about 15% of the total fruit (Simmonds, 1959). Therefore, the potential exists for extracting starch from the green bananas.

The banana fruit is made up of the pulpy tissue surrounded by the peel. The peel consists of an outer epidermis made-up of mainly chlorenchyma tissues and an inner layer made of parenchyma tissues. These tissues contain various amounts of pectic substances, tannins, phenols and enzymes that catalyze the formation of brown polyphenols. Green, unpeeled bananas characteristically develop a brown coloration when bruised, cut or milled. Due to these drawbacks extracting starch from unpeeled bananas is a difficult task. Banana starch has been extracted from peeled bananas in the laboratory (Rasper, 1969; Patil and Majar, 1974; Kalenga et al., 1981; Ling et al., 1982; Lii et al., 1982). A pilot plant production of banana starch from peeled bananas has been attempted with limited success (Chiang et al., 1987).

A laboratory process of starch extraction from unpeeled banana was described in Japanese Patent Application 7,679, 742 (Kanie, 1976) and in other publications (Fujimoto et al., 1977(a); 1977(b); Sugimoto et al., 1980). In all the laboratory trials the efficiency of the starch separation ranged from 6–12.4% and the starch obtained was of questionable quality to be considered wholesome for food application. The prior art process for producing banana starch from unpeeled bananas has significant limitations precluding its employment for commercial production of food grade starch. Therefore, prior to this invention, the prior art has not provided a commercially viable, reduced to practice process for producing food grade starch from unpeeled bananas.

SUMMARY OF THE INVENTION

The present invention relates to a food grade starch produced from unpeeled green bananas. The said starch has specifications and quality attributes that render it acceptable for food applications as a native starch or modified product after subsequent modification of the native starch using prior art technologies.

Also within the scope of the present invention is a process for the production of the food grade starch from unpeeled green bananas. The process comprises the steps of an optional, initial size reduction of the whole banana followed by wet milling of the comminuted bananas or whole bananas in lye solution, holding the milled slurry for a time period, and screening the slurry to remove most of the pomace and skin fibers.

The process comprises further steps of centrifugal concentration of the screened starch solution, centrifugal or hydrocylone washing of the concentrated starch solution to remove residual fiber left over from the screening operations and neutralizing the concentrated starch with acid. Further processing steps consist of dewatering the washed, concentrated starch in a dewatering press or centrifuge and drying in a dispersion dryer or any suitable dryer to yield the final dried starch product.

DETAILED DESCRIPTION OF THE PRESENT INVENTION

The invention relates to a process for producing a food grade native starch from unpeeled green bananas. The unit operations or processes generally used in the process are wet milling of the bananas in lye solution, holding the slurry containing the starch for a period of time, sequentially screening the milled slurry to remove skin fibers and pomace, concentrating the starch slurry, further washing to remove the fine fibrous materials, dewatering by centrifugation or pressing and drying. Other optional unit operations include destalking of the banana fingers before milling and initial comminution of the whole bananas by tearing, slicing, dicing or any other operation before milling.

The term "food grade" as used herein is intended to designate the quality characteristics of that starch in terms of purity, ash content, protein content, color, herbicides, pesticides and fungicide residue levels in the final starch, that make it wholesome for use in food applications.

The process in this invention for producing banana starch of wholesomeness suitable for use in food applications involves the operations described hereafter:

The first preferable step of the process for the production of banana starch according to the invention is the comminution of the fruit, for example by dicing, macerating, tearing or splitting, slicing or coarse milling. This optional operation is performed at a fast rate and is performed only to accelerate the mechanical feeding of the banana into the equipment of the subsequent operation. Thereafter the banana is wet milled (hammer, disc attrition, colloid or ball) using a lye solution of less than 0.15N concentration, preferably 0.05N concentration and at a liquid to banana ratio range of 1:1 to 4:1, preferably 2:1 to 4:1 and more preferably 2.5:1 to 3:1. The preferred lye solution is sodium hydroxide, however, this invention does not preclude the use of other alkali solutions such as potassium hydroxide, calcium hydroxide and others. The objective of this milling operation is to reduce the particle size of the banana to a mechanically possible minimum level in order to facilitate the recovery of starch. An optional operation that could augment inadequacies in selected equipment is to feed the milled slurry through an in-line mixer or homogenizer. The milled lye slurry of banana is held for about 1 to about 5 hours, preferably about 1 to about 4 hours and more preferably about 2 to about 3 hours. The slurry is then diluted with water to facilitate screening.

Screening is accomplished using a series of screens with decreasing mesh sizes ranging from 30 to 400 mesh, preferably from 60 to 350 or more preferably from 80 to 350 mesh. The number of effective screens ranges from 2–6, preferably 2–5 and more preferably 2–3. The preferred operation for removal of fiber from the banana starch solution is screening, however, the invention does not preclude the use of other separation methods such as sedimentation and "starch tabling" known to prior art in the starch industry. The retentate on the first screen is reslurried in water at a ratio of 4:1 water to starting material, preferably 3:1 or more preferably 2.5:1 and screened again through the #1 of 30–150 mesh screen or a screen of the same mesh size.

The permeate from the last screening operation, referred to as the "crude starch solution" (CSS), is then concentrated in a nozzle bowl centrifuge or hydrocyclones to 5–30% solids, preferably to 10–30% solids and more preferably to 15–20% solids. The concentrated CSS is then purified by counter-current washing with water in the nozzle bowl centrifuge until the overflow has the same clarity as the inlet water. It is worth noting that the use of a nozzle bowl centrifuge herein does not preclude the use of other washing devices such as hydrocylones known to be used in the starch industry for the same purpose. The purified starch solution (PSS) is neutralized and dewatered by use of a decanter or a basket centrifuge to about 30–75% solids, preferably to 40–70% solids and more preferably to 50–70% solids. It is further worth noting that the use of centrifuges in the dewatering of the starch does not preclude the use of other devices such as dewatering presses, which are known in prior art to be used for similar applications.

The dewatered starch is then dried in such a way as to maintain the native structure and functional characteristics of the banana starch without any thermal changes such as gelatinization. Dispersion dryers, vacuum dryers, spray dryers could be configured to achieve this purpose. The dried starch is optionally milled and screened before packaging. The starch produced by the invention described herein is of high quality and has quality and functional characteristics that make it wholesome for use in food applications. The product starch is greater than 95% pure, less than 1% protein, less than 0.07% ash, white in color and free of detectable pesticides and/or fungicides.

The present invention is further illustrated by the following examples which are not intended to limit the effective scope of the claims.

To minimize any deleterious changes in the production yield and not necessarily due to inadequacies of the invention herein described, the bananas are held in storage conditions known to minimize such quality defects. The feed material described in the present patent examples were processed at various lengths of time, therefore, yields are different.

EXAMPLE 1

A 1300 kg quantity of green, ungassed reject bananas were diced using an Urschell Slicer/Dicer into little dices. The diced bananas were fed into a Fitzpatrick comminuting mill (Fitz mill) simultaneously with an 0.05N solution of sodium hydroxide. The ratio of the lye solution to bananas was 3:1. The Fitz mill was fitted with a screen with an opening of 0.125 inches. The milling was done at a feed rate of 300 kg/hr for the diced bananas and at lye solutions input of 900 L/hr. The milled banana slurry was allowed to rest in storage tanks for 2 hours after which time the slurry was diluted with water to maintain a concentration ratio of 5:1 aqueous solution to bananas. The stored and diluted solution was then screened through two consecutive screens consisting of screens of 80 and 200 mesh sizes. The retentate of the first screening was washed with water at a ratio of 2.5:1 water to starting material. The permeate from the first screening was passed through the second screen to obtain the crude starch solution (CSS). The CSS was concentrated in a nozzle bowl centrifuge to a solids content of 15–20% and thereafter counter-currently washed with water in order to purify the starch. The purified starch solution (PSS) was then dewatered in a Westfalia decanter centrifuge to a solids content of 55%. The dewatered starch from the centrifuge still had a brownish color and was, therefore, reslurried in water at a ratio of 2.5 water to starch for washing in a nozzle bowl centrifuge. The slurry (10% solids solution) was further centrifuged in a basket centrifuge to a solids content of 66%. The resulting purified starch was dried in a Barr & Murphy ring dryer to a moisture content of 9.2%. The starch was then sieved and packaged. The starch produced had the quality characteristics shown below:

| Purity (%) | Moisture (%) | Ash (%) | Protein (%) | Oil (%) | Fiber (%) | pH |
|---|---|---|---|---|---|---|
| 96% | 9.20 | 0.04 | 0.72 | 0.13 | 0.14 | 8.0 |

Pesticide Residue Levels

| | |
|---|---|
| Aldicarb | Not detected |
| Aldicarb sulfoxide | Not detected |
| Aldicarb sulfone | Not detected |
| Carbaryl | Not detected |
| Chlorpyrifos | Not detected |
| Chlorthalonil | Not detected |
| Diazinon | Not detected |
| Imazalil | Not detected |
| Malathion | Not detected |
| Thiabendazole | Not detected |
| Trichlorfon | Not detected |
| Dichlorvos | Not detected |

EXAMPLE 2

A 1300 kg sample of reject green bananas containing 0.38 ppm of Imazalil was processed as described in Example 1. The final starch had quality characteristics as shown below:

| Purity (%) | Moisture (%) | Ash (%) | Protein (%) | Oil (%) | Fiber (%) | pH |
|---|---|---|---|---|---|---|
| 97% | 13.01 | 0.04 | 0.78 | 0.09 | 0.09 | 7.8 |

Pesticide Residue Levels

| | |
|---|---|
| Aldicarb | Not detected |
| Aldicarb sulfoxide | Not detected |
| Aldicarb sulfone | Not detected |
| Chlorpyrifos | Not detected |
| Chlorthalonil | Not detected |
| Diazinon | Not detected |
| Imazalil | Not detected |
| Malathion | Not detected |
| Thiabendazole | Not detected |
| Trichlorfon | Not detected |
| Dichlorvos | Not detected |

EXAMPLE 3

A 1300 kg sample of green reject bananas were obtained from Costa Rica. The ungassed bananas had 0.03 ppm of chlorpyrifos and 1.1 ppm of Imazalil. The bananas were processed essentially as described in Example 1 except that three screens consisting of a 60 mesh screen, a 200 mesh and 325 mesh in the first, second and third positions respectively were used. The starch was purified in a nozzle bowl centrifuge and dewatered on a decanter centrifuge. Drying was done using a Barr & Murphy ring (dispersion) dryer. The quality characteristics of the final starch product are shown below:

| Purity (%) | Moisture (%) | Ash (%) | Protein (%) | Oil (%) | Fiber (%) | pH |
|---|---|---|---|---|---|---|
| 97% | 10.62 | 0.04 | 0.78 | 0.14 | 0.13 | 6.9 |

Pesticide Residue Levels

| | |
|---|---|
| Aldicarb | Not detected |
| Aldicarb sulfoxide | Not detected |
| Aldicarb sulfone | Not detected |
| Carbaryl | Not detected |
| Chlorpyrifos | Not detected |
| Chlorthalonil | Not detected |
| Diazinon | Not detected |
| Imazalil | Not detected |
| Malathion | Not detected |
| Thiabendazole | Not detected |
| Trichlorfon | Not detected |
| Dichlorvos | Not detected |

EXAMPLE 4

A 1300 kg sample of reject green bananas containing 0.03 ppm of chlorpyrifos was processed as described in Example 3. The quality characteristics of the final starch are shown below:

| Purity (%) | Moisture (%) | Ash (%) | Protein (%) | Oil (%) | Fiber (%) | pH |
|---|---|---|---|---|---|---|
| 97% | 11.22 | 0.05 | 0.61 | 0.07 | 0.05 | 7.2 |

Pesticide Residue Levels

| | |
|---|---|
| Aldicarb | Not detected |
| Aldicarb sulfoxide | Not detected |
| Aldicarb sulfone | Not detected |
| Carbaryl | Not detected |
| Chlorpyrifos | Not detected |
| Chlorthalonil | Not detected |
| Diazinon | Not detected |
| Imazalil | Not detected |
| Malathion | Not detected |
| Thiabendazole | Not detected |
| Trichlorfon | Not detected |
| Dichlorvos | Not detected |

The invention thus described may be varied in several ways. For example hydrocyclones could be used to replace the nozzle bowl centrifuge in the concentration and purification step. Optionally the starch can be washed with ethanol to improve the quality/purity of the starch product. Such variations are not to be regarded as a departure from the embodiment and scope of the invention and all such modifications are intended to be included within the scope of the following claims:

We claim:

1. A process for producing banana starch wherein the input feed is unpeeled green bananas and comprising the steps of lye milling of the green bananas, holding the milled banana slurry for a period of time sufficient to promote release of starch from the milled bananas, separating fiber and pomace from the milled banana slurry to form a starch slurry, concentrating, washing and neutralizing the starch slurry, dewatering the neutralized starch slurry, and drying the starch to obtain banana starch free from detectable pesticides and/or fungicides.

2. The process of claim 1 wherein the input feed of green bananas includes rejects and trimmings from processing lines.

3. The process of claim 1 further comprising an optional initial comminution step includes slicing, dicing or tearing of the bananas.

4. The process of claim 1 wherein the lye milling step is carried out using a lye solution of less than 0.15N concentration.

5. The process of claim 4 wherein the lye solution is an alkali or alkali earth oxide or hydroxide.

6. The process of claim 5 wherein the lye solution is added to the bananas at a ratio between 1:2 banana: solution to 1:4 banana:solution.

7. The process in claim 1 wherein the milled banana slurry is held for a minimum period of 1 hour.

8. The process in claim 7 wherein the starch slurry is separated from the slurry by sieving the slurry on screens.

9. The process in claim 7 wherein the screens are arranged in consecutive order with decreasing mesh size.

10. The process in claim 9 wherein the screens include a first screen of between 30–150 mesh, a second screen of 200–250 mesh and a third screen of 300–400 mesh.

11. The process of claim 1 wherein the starch slurry is concentrated and washed before neutralization.

12. The process of claim 11 wherein the concentration and washing is carried out in a nozzle bowl centrifuge, band filter and/or hydrocyclones.

13. The process of claim 1 wherein the dewatering step is performed using a decanter centrifuge, basket centrifuge or dewatering press.

14. The process of claim 1 wherein the dewatered starch is dried in such a way as to prevent gelatinization.

15. The process of claim 14 wherein the drying step is performed on a dispersion dryer, fluidized bed dryer, spray dryer or band dryer.

* * * * *